United States Patent [19]

Demeyer

[11] Patent Number: 4,689,712
[45] Date of Patent: Aug. 25, 1987

[54] CIRCUIT BREAKER WITH SOLID-STATE TRIP UNIT WITH A DIGITAL PROCESSING SYSTEM SHUNTED BY AN ANALOG PROCESSING SYSTEM

[75] Inventor: Pierre Demeyer, Uriage, France

[73] Assignee: Merlin Gerin S.A., France

[21] Appl. No.: 827,436

[22] Filed: Feb. 10, 1986

[30] Foreign Application Priority Data

Feb. 25, 1985 [FR] France .................. 85 03161

[51] Int. Cl.⁴ .......................................... H02H 3/08
[52] U.S. Cl. ...................................... 361/96; 361/87; 364/483
[58] Field of Search .............. 361/42, 47, 50, 55, 361/87, 93–96, 103; 364/483, 492

[56] References Cited

U.S. PATENT DOCUMENTS

| | | | |
|---|---|---|---|
| 4,291,355 | 9/1981 | Dinger | 361/96 X |
| 4,324,987 | 4/1982 | Sullivan et al. | 364/492 X |
| 4,351,012 | 9/1982 | Elms et al. | 364/483 X |
| 4,371,947 | 2/1983 | Fujisawa | 364/483 X |
| 4,377,836 | 3/1983 | Elms et al. | 361/96 |
| 4,544,982 | 10/1985 | Boothman et al. | 361/103 X |
| 4,589,052 | 5/1986 | Dougherty | 361/96 X |

FOREIGN PATENT DOCUMENTS

| | | | |
|---|---|---|---|
| 0133968 | 3/1985 | European Pat. Off. | |
| 3247439 | 7/1984 | Fed. Rep. of Germany | 361/93 |
| WO81/02496 | 9/1981 | PCT Int'l Appl. | 361/94 |

*Primary Examiner*—A. D. Pellinen
*Assistant Examiner*—Derek S. Jennings
*Attorney, Agent, or Firm*—Parkhurst & Oliff

[57] ABSTRACT

Solid-state trip unit having a unit (29, 50, 48) for digital processing of signals emitted by current sensors (16). The digital processing system provides the long delay, short delay and instantaneous tripping functions and delivers a tripping order to the relay (14). An analog processing unit (70) is connected parallel with the digital processing unit to transmit an instantaneous tripping order to the relay (14). When the digital processing unit operates, the analog unit pick-up level is higher than the digital instantaneous tripping pick-up and this pick-up is reduced to a lower or equal value, if the digital unit is inactive.

3 Claims, 11 Drawing Figures

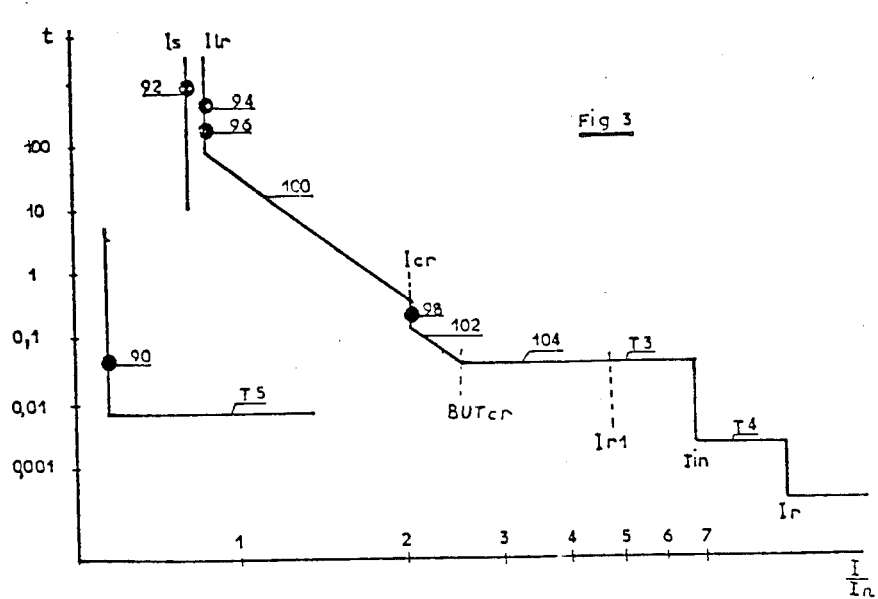
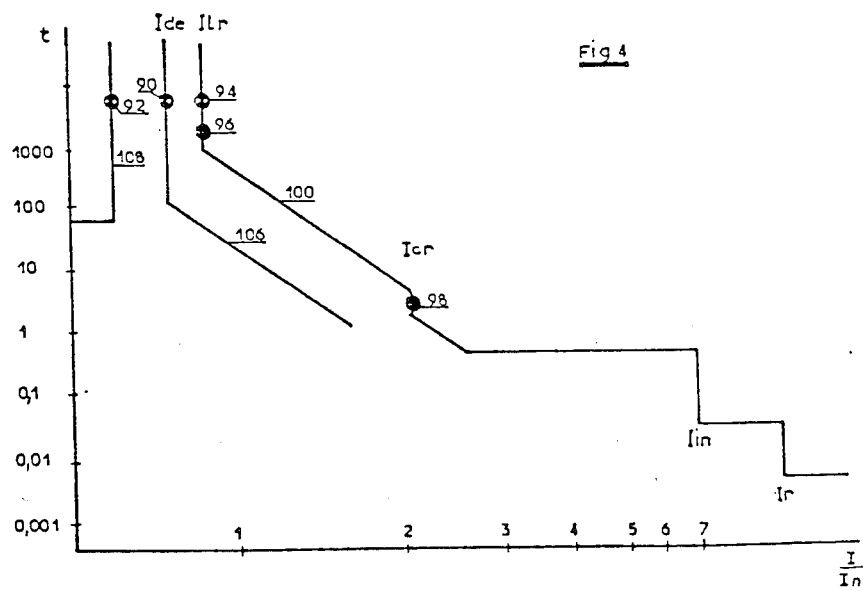

CIRCUIT BREAKER WITH SOLID-STATE TRIP UNIT WITH A DIGITAL PROCESSING SYSTEM SHUNTED BY AN ANALOG PROCESSING SYSTEM

BACKGROUND OF THE INVENTION

The invention relates to a digital solid-state trip unit for an electrical circuit breaker. The advantages of microprocessor-based digital solid-state trip units are well known, in particular the large number of possible functions and settings. The time required for digital processing is longer than that taken by analog processing and in the event of a high short-circuit, this delay might have harmful consequences for the circuit breaker. On start-up, notably when the circuit breaker closes, the device becomes operational after a certain far from negligible lapse of time, and in the case of closing on a fault, the installation and the circuit breaker are poorly protected.

The object of the present invention is to produce a digital trip unit having the advantages of analog systems.

SUMMARY OF THE INVENTION

The trip unit according to the invention is characterized by the fact that said analog signal is applied parallel to the digital processing unit to an analog processing unit, designed to send an instantaneous tripping order when a pick-up level is exceeded, said order being transmitted to said tripping means.

The analog system makes use of sensors and of the tripping relay of digital trip unit, only the digital processing system being shunted by the analog processing system, the latter being active for certain instantaneous trippings. This doubling up constitutes a safety and dependability factor of the trip unit.

According to an alternative embodiment of the invention, the analog system pick-up level is lowered during the start-up period, so as to take over from the digital processing for the instantaneous tripping function. Protection is thus provided both for the installation and for the circuit breaker.

BRIEF DESCRIPTION OF THE DRAWINGS

Other advantages and characteristics will become more clearly apparent from the following description of an embodiment of the invention, given as examples only and represented in the accompanying drawings, in which:

FIGS. 3 and 4 represent the tripping curves of the two versions of the trip unit according to the invention;

DESCRIPTION OF THE PREFERRED EMBODIMENTS

General structure

Figure 1:
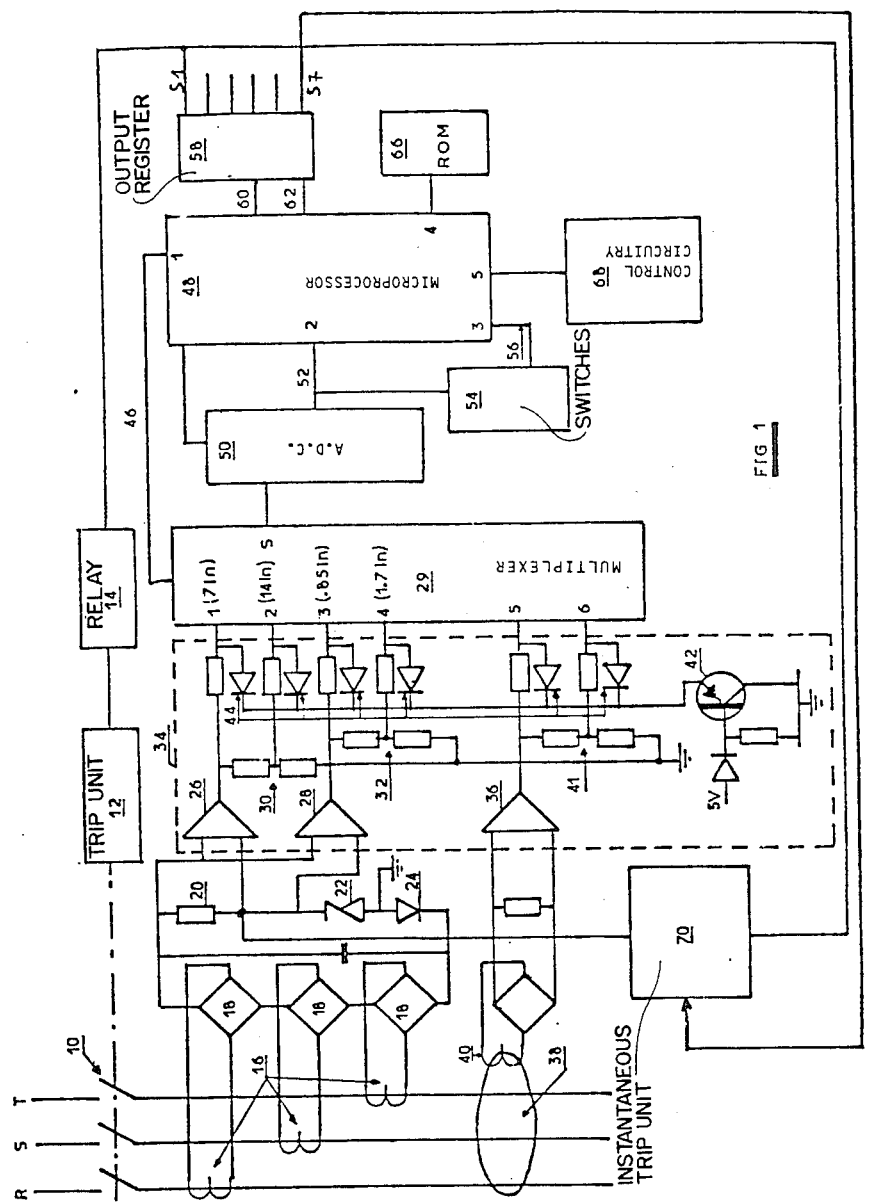
FIG. 1 is a block diagram of the trip unit according to the invention.
Figure 2:
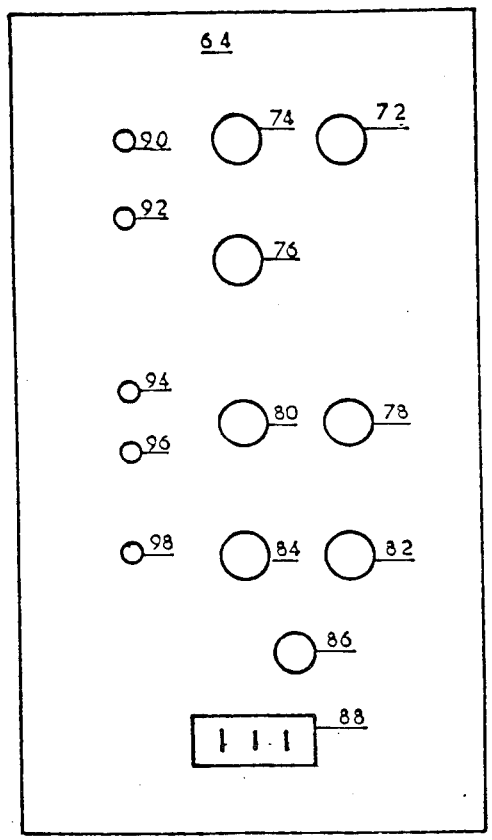
FIG. 2 shows the trip unit front panel with the setting and signalling devices.

In FIG. 1, an electrical distribution system with four conductors RSTN supplying a load (not represented) comprises a circuit breaker 10 to interrupt the circuit in its open position. The mechanism 12 of the circuit breaker 10 is controlled by a biased relay 14, ordering tripping of the circuit breaker in the event of an overload, short-circuit or ground fault. Each phase conductor RST has associated with it a current transformer 16, which delivers a signal proportional to the current flowing through the associated conductor, the signal being applied to a double alternation rectifier bridge 18. The outputs of the three rectifier bridges 18 are connected in series in a circuit, comprising in series a resistor 20, a Zener diode 22 and a diode 24 to provide, at the terminals of the resistor 20 a voltage signal proportional to the maximum value of the current flowing through the conductors RST, and at the terminals of the diodes 22, 24 a power supply voltage to the electronic circuits. The voltage signal is applied to the inputs of the two amplifiers 26, 28 with different gains and the output of each amplifier 26, 28 is connected on the one hand to an input 1, 3 of a multiplexer 29 and on the other hand to a divider bridge 30, 32, whose midpoint is connected to an input 2, 4 of the multiplexer 29. The assembly, amplifiers 26, 28 and divider bridges 30, 32, belongs to a voltage signal calibration circuit 34, described in detail hereinafter and marked with a dashed line in FIG. 1.

The calibration circuit 34 comprises a third amplifier 36, which receives a signal delivered by the summing transformer 38, whose primary windings are constituted by the conductors NRST running through a toroid, having a secondary winding 40 which delivers a signal in the event of an ground fault. The output of the amplifier 36 is connected to input 5 of the multiplexer 29 and to a divider bridge 41, whose mid-point is connected to input 6 of the multiplexer 29. Inputs 1 to 6 are connected in parallel by diodes 44 to the emitter of a transistor 42 whose collector is grounded and whose base is biased by a preset voltage, for example 5 Volts, corresponding to the maximum value applicable to the multiplexer 29. It can easily be seen that the multiplexer 29 receives signals representative of the phase current on the four inputs 1 to 4 and signals representative of the earth current on the two inputs, 5, 6. These signals, notably the ground fault ones, can naturally be generated differently, for instance from signals supplied by the current transformers 16.

The multiplexer 29, for example an ADCO808 multiplexer from the National Semiconductor Corporation, is controlled by the address and monitoring line 46 connected to the outputs 1 of a microprocessor 48. Depending on the address supplied by the microprocessor 48, the signal from one of the inputs 1–6 of the multiplexer 29 is transmitted by the output S of the multiplexer 29 to an 8-bit analog-to-digital converter 50. A bus 52 connects the output of the analog-to-digital converter 50 to an input, output 2 of the microprocessor 48. A block 54 of eight multiplexed switches 72–86 is connected to the microprocessor 48, on the one hand by a connection to the bus 52 and on the other hand at 3 by an address link 56. Each switch 72-86 has eight distinct setting positions of the tripping parameters, described hereinafter.

An output register 58 is connected to the microprocessor 48 by a 6-bit link 60 and a 1-bit link 62 for transmission on 7 output channels S1 to S7 of the control and signalling orders. The output S1 is connected to the relay 14 to control tripping of the circuit breaker 10, whereas the outputs S2 to S6 are connected to control panel display means 64, located on the front of the circuit breaker, notably of the trip unit housing containing the control and tripping on fault circuits and components. The output S7 is connected to an analog tripping control described hereinafter.

A non-volatile ROM 66 is connected to a connection 4 of the microprocessor 48 to supply it with the execution program and the permanent data stored in the form of arrays. The recorded program corresponds to the functions performed by the trip unit. A single trip unit can be designed for several ranges of functions and each range naturally has its own special program. The program selected can be recorded in the ROM at the time of manufacture or according to a preferred embodiment, the various programs are recorded in different memories, the trip unit being customized by selection of the appropriate memory, when fitting. The control circuitry, contained in a block 68 connected to an input 5 of the microprocessor 48, comprises the circuits necessary for operation of the microprocessor, in particular the clock for sequencing instruction running, the reset and analog circuitry.

The microprocessor is for example the model MC 146805 marketed by the Motorola Corporation, which contains the standard resources, such as the CPU, interfaces, volatile RAM, and computing unit.

The digital tripping control described above has associated with it a conventional instantaneous trip unit 70, receiving the analog phase signal at the output from the rectifier bridges 18. The unit 70 compares this signal with a preset pick-up value, and emits a tripping order transmitted to the relay 14, when the pick-up level is reached as described hereinafter in detail. The unit 70 ensures a speed of tripping greater than that of the digital trip unit.

It should be noted that FIG. 1 and the corresponding description contain the essential elements for operation of the trip unit, the accessory elements of the analog and digital parts, such as the power supplies, bias resistors and capacitors, fleeting signal registers and memories, having been omitted so as not to make the description unnecessarily long.

Tripping characteristics

The control panel 64 contains eight switches 72-86 which are the eight switches of the block 54 illustrated in FIG. 1. Each eight-position switch cooperates with a resistive network to select one of the eight distinct values, transmitted to the microprocessor 48 when the block 54 is requested for information. The panel 64 also houses five light-emitting diodes or indicator lamps 90-98 and a test unit connector 88.

The trip unit according to the invention can be used for two types of function, a protection function on phase and ground fault and a protection function on phase fault and a loadshedding function.

(1) Ground protection

FIG. 3 illustrates, on a logarithmic scale, the phase and ground protection tripping curves.

The long delay pick-up ILR, that is to say the current intensity beyond which the long delay trip cycle is triggered, can be adjusted by the switch 80. The time after which the circuit breaker trips depends on the current intensity, the relation being an inverse time one, $I^2t = T1 = $ constant, which in logarithmic coordinates is expressed by the sloping right-hand segment 100. The long delay time can be adjusted by the switch 78 which modifies the constant T1.

If the current intensity exceeds a second pick-up, in this case the short delay pick-up ICR, the trip unit triggers a short delay trip, which occurs before the long delay trip. The curve representing the short delay trip comprises two successive segments, the inverse time segment 102, represented by the relation $I^2t = T2$, and the definite time T3 segment 104. The switch 84 adjusts the short delay pick-up ICR and the switch 82 that of the definite short delay time T3. Switching over from the definite time characteristic to the inverse time one is set at a constant current value.

A third pick-up, IIN, higher than the pick-up ICR and adjustable by means of the switch 86, triggers the instantaneous trip cycle, whose time delay T4 corresponds to the trip unit response time which is not adjustable.

Above a fourth pick-up IR the instantaneous analog trip unit 70 operates under normal operating conditions to cause extra-fast opening of the circuit breaker 10.

In FIG. 3, an overload pick-up Is can also be seen, with a slightly lower abscissa than that of the long delay pick-up ILR, which when exceeded indicates the proximity of the long delay pick-up and the risk of tripping. The switch 76 adjusts the overload pick-up setting Is. This pick-up Is overshoot signal can be used for simplified load-shedding control, for instance to break a non-priority circuit. As soon as the current reverts below the pick-up Is, the output is deactivated and the shed circuit is reconnected.

The curve representing the ground protection comprises a ground protection pick-up IP and a definite time delay T5. The pick-up IP setting can be adjusted by the switch 74 and the time delay T5 by the switch 72.

The state of the trip unit at a given moment is displayed on the panel 64 by the light-emitting diodes or indicator lamps 90-98, represented on the curves in FIG. 3. The indicator lamp 90, represented by a solid circle on the ground protection pick-up IP, is lit when the circuit breaker 10 trips on a ground fault. It remains lit until external action is taken, for example resetting. The indicator lamp 92, represented by four alternate black and white circular sections, lights up when the overload pick-up Is is exceeded and goes out automatically as soon as the current drops below this pick-up level. The indicator lamp 94 lights up when the long delay pick-up ILR is exceeded, and goes out if the current value drops below this pick-up level before the end of the time delay. An overload trip, controlled by the long delay circuit, is signalled by the indicator lamp 96 whereas a short delay and instantaneous trip causes the indicator lamp 98 to come on. External action is required to put the indicator lamps 96, 98 out. These setting and display techniques are well known in the art, and it is pointless describing them in detail. The setting accuracy can be improved by using switches 72-86 having a greater number of positions or according to a preferred embodiment by a combination of two setting adjustment means, more particularly of the switch 76 and of the other setting switches. A combination of this kind gives 64 setting positions, the switch 76 serving a dual purpose, made possible by a sufficiently large gap between the pick-ups Is and ILR. Independent switches may be added to achieve this kind of combination.

(2) Load-shedding

The same unit can be used for another version of protection, illustrated by the curves in FIG. 4. In this version the phase protection tripping curve is the same as the one illustrated in FIG. 3, but ground protection is not provided. The switches 72, 74 and indicator lamps 90, 92 associated with this function are available and the software is modified to provide a load-shedding and restoring function illustrated by the curves 106, 108. The load-shedding pick-up IDE setting, lower than the long delay pick-up ILR, is adjustable by means of the switch 72, the indicator lamp 90 signalling a load-shedding operation. The load-restoring pick-up IRE, different from and lower than the load-shedding pick-up IDE, is adjustable by the switch 74 and signalled by the indicator lamp 92. The load-shedding curve 106 is an inverse time curve parallel to the long delay protection curve 100, whereas the load-restoring curve 108 is a definite time curve. The settings should always cause load-shedding to occur before a long delay trip.

Calibration circuit

The various protections and functions of the trip unit require a wide current measurement range. An overall range of 0.4 In (In being the rated current) for the lowest delay pick-up and 12In for the highest instantaneous trip pick-up is achieved, i.e. a ratio of 30 to 1. To obtain a sufficiently high accuracy, notably a resolution of 1%, the number representing 0.4 In must have at least the value 100, which results in a value of 3000 for the maximum current of 12 In. The number 3000 requires 12-bit coding, but a 12-bit analog-to-digital converter is slow and expensive.

Figure 5:
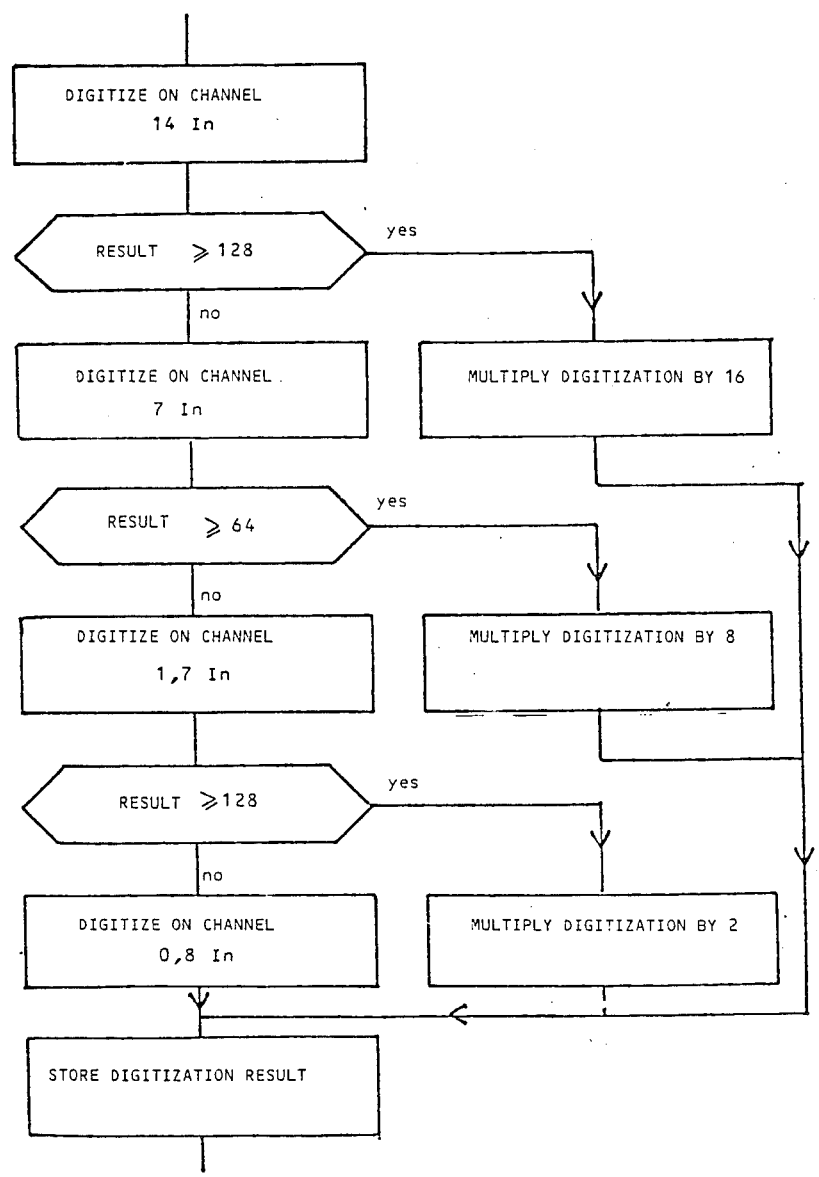
FIG. 5 is the flow chart of the rating change function.

The calibration circuit 34 according to the invention adapts the range of the analog loop so that of the 8-bit analog-to-digital converter 50 while respecting the accuracy of 1%. To this end, the gain of the amplifier 26 is selected to transform an analog signal, corresponding to a maximum current of 14 In, applied to its input as a maximum signal, for example of 5 Volts, occurring on input channel 2 of the multiplexer 29 which will be digitized by the value 256 at the output of the analog-to-digital converter 50. The divider bridge 30, of ratio 2, applies a double signal to channel 1 and the maximum value of 5 Volts is not exceeded so long as the analog signal at the input of the amplifier 26 remains below 7 In. Similarly, the amplifier 28 applies to input 4 of the multiplexer 29 a maximum signal for a current value of 1.7 In and to input 3 a maximum signal for a current value of 0.85 In. It can easily be seen that the ratio of the gains of the amplifiers 26, 28 is 8. The microprocessor 48 selects one of the channels 1 to 4 in terms of the current value, in this instance channel 2 for a current between 7 and 14 In, channel 1 for a current between 1.7 and 7 In, channel 4 for a current between 0.85 and 1.7 In, and channel 3 for a current lower than 0.85 In. The microprocessor 48 multiplies the digitization by a factor which takes account of the channel selected, to re-establish the initial level of the signal. Operation of this calibration circuit is set out in the flow chart illustrated in FIG. 5:

The microprocessor 48 activates channel 2 (14 In) and digitizes the corresponding signal. If the result is greater than the value 128, the digitization is multiplied by 16 and stored in a RAM. If the result is lower than 128, digitization is carried out on channel a (7 In) and when the result is greater than 64 the digitization is multiplied by 8 and the result is stored in the RAM. When the result is lower than 64, digitization is performed on channel 4 (1.7 In), and if the digitization is greater than 128, it is multiplied by 2 before being stored in the memory. For a result lower than 128, digitization is performed on channel 3 (0.85 In), and the result is stored directly in the memory. The range of the 8-bit analog-to-digital converter 50 is thus adapted to the current variation range from 0.4 In to 12 In ensuring sufficiently high accuracy. It should be noted that the number of channels and thereby the number of ratings may be increased for greater accuracy or amplitude range or that this number of channels may on the other hand be decreased to achieve the opposite.

Referring to FIG. 1, it can be seen that the ground fault signal will be applied only to the 2 channels 5 and 6. The range of this signal is smaller than that of the phase fault and the two ratings are sufficient. Selection of the two channels 5, 6 by the microprocessor 48 is performed in the manner described above, and which it is pointless repeating.

The use according to the invention of the multiplexer 29 and of the calibration circuit 34 enables the ranges of the analog loop and of the digital loop to be matched simply.

Sampling, latching at the last peak

Switching over from the analog loop to the digital loop is expressed by a sampling of the signals processed. The value of the digital signal remains constant throughout the sampling period and this period is determined by the sampling frequency set by the microprocessor 48. This period, for example 1.84 milliseconds, must be compared to be alternating signal alternation period of 10 milliseconds, and it is clear that the error introduced by sampling is not negligible. The chronogram in FIG. 6a shows on the one hand the variation curve 110 of a rectified double alternation analog signal, in terms of time, and on the other hand the curve 112 of the corresponding sample available at the output of the analog-to-digital converter 50. These curves 110, 112 show up the error mentioned above, notably on the peak value of the signals, which may reach 10%. The level of this peak value, which determines tripping and tripping time delay, is apparent from the foregoing description. The error on the peak value measurement affects the tripping time delay, and this inaccuracy particularly hampers tripping discrimination. We know that in an electrical distribution system several circuit breakers are connected in series, the tripping characteristics of these circuit breakers being staggered in order to provide tripping discrimination, only the circuit breaker directly upstream from the fault opening to eliminate the fault, the other circuit breakers remaining closed to supply the non-faulty branches of the distribution system. Time discrimination is achieved when the non-tripping time of the upstream circuit breaker is greater than the tripping time, i.e. than the total breaking time of the downstream circuit breaker. The tripping and nontripping curves, of the type illustrated in FIGS. 3 and 4, of series-mounted circuit breakers should be displaced sufficiently to avoid any intersection of these curves. These discrimination problems, and the advantages of having as small a difference as possible between the tripping and non-tripping time in order to break the fault current as quickly as possible while still supplying power to the non-faulty parts of the installation, are well known in the art.

According to the invention, the accuracy of the sampled peak value is increased by latching and storing the last peak and processing this value latched at the last peak to provide the protection functions.

Figure 6:
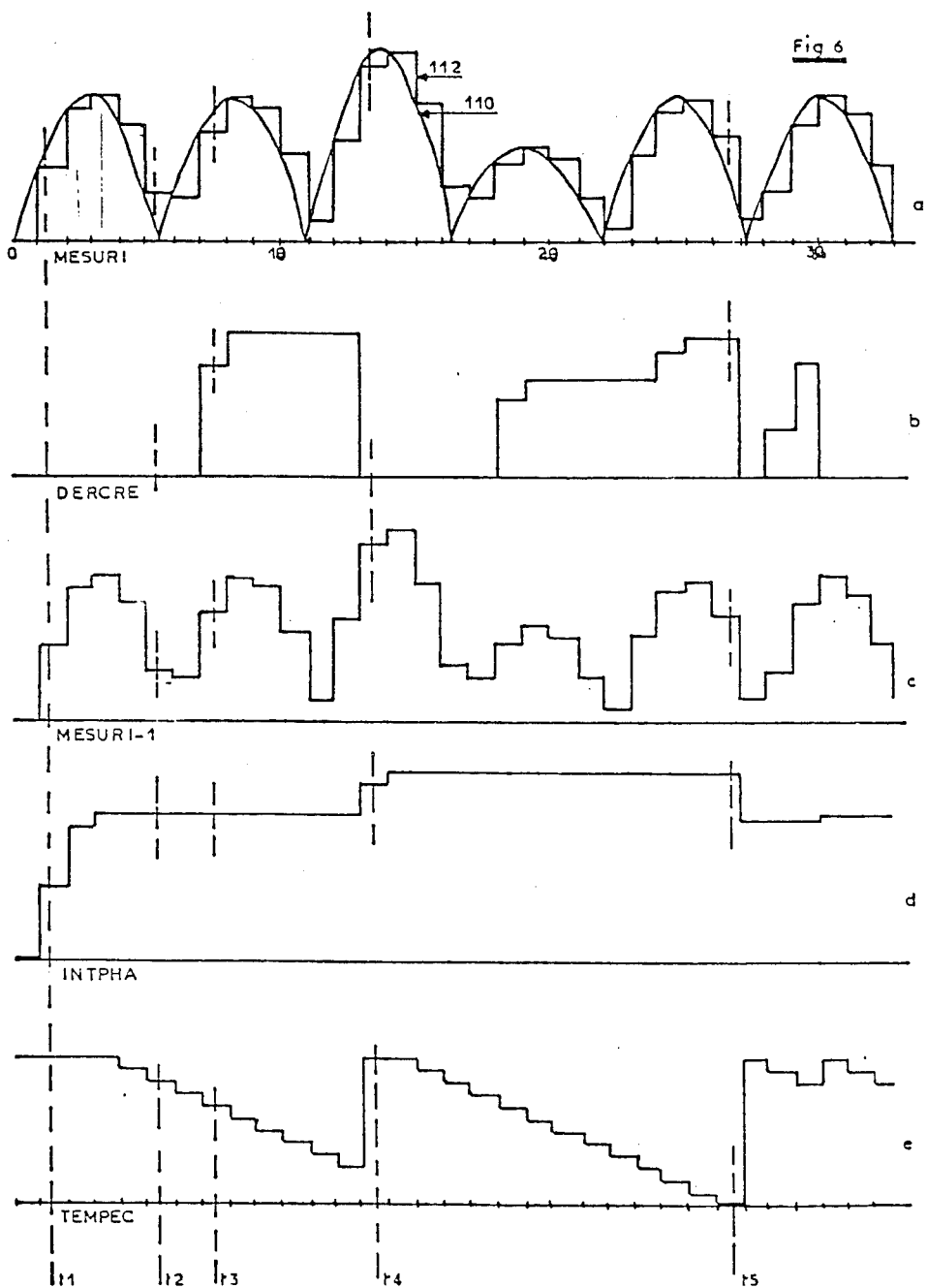
FIG. 6 shows the variation of the signals processed by the microprocessor for inverse time functions.

The five values represented by the curves in FIGS. 6 a, b, c, d, e, are stored in a RAM. These values are:

MESURI which is the measurement of the sample current processed at a time t.

MESURI-1 which is the measurement of the sample current processed at a time t−1.

INTPHA which is the sampled value of the phase current, latched at the last peak.

DERCRE which is the value of the last peak lower than the value INTPHA.

TEMPEC which is the time gone by managed as a countdown.

Figure 7:
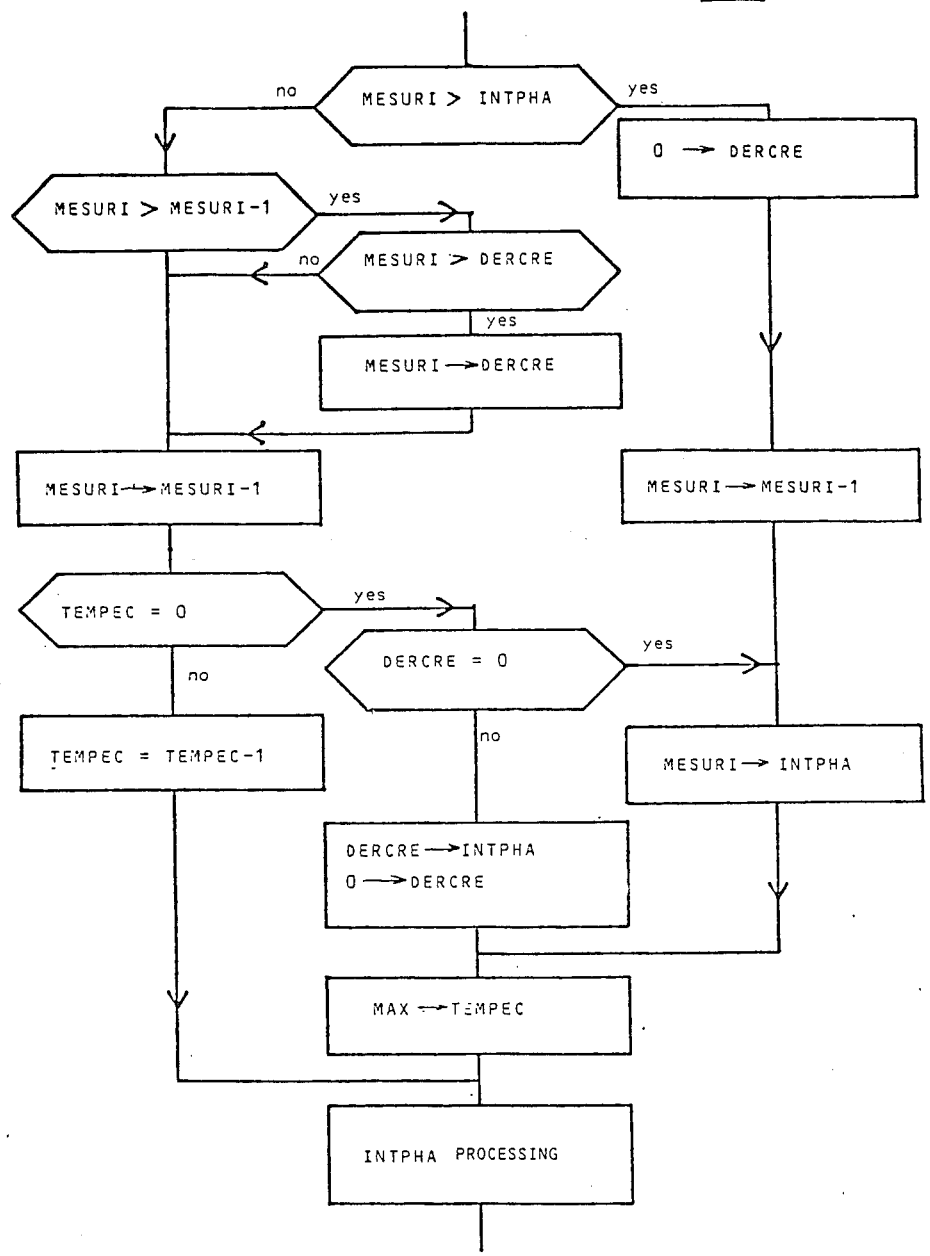
FIG. 7 is the flow chart of the latching function at the last peak.

FIG. 7 represents the processing flow chart:

At the time t1 the microprocessor 48 calls and processes the sampled current measurement signal MESURI supplied by the analog-to-digital converter 50 (FIG. 6a). This signal MESURI is compared with the stored phase current signal INTPHA (FIG. 6d), latched at the last peak. If MESURI is higher than INTPHA the peak value is increasing and the DERCRE value, which represents the value of the last peak lower than the INTPHA signal, is reset.

The MESURI value is recorded in the MESURI-1 memory (FIG. 6c) and in the INTPHA memory (FIG. 6d). The TEMPEC value (FIG. 6e), which manages the countdown, is set to the maximum and the INTPHA value is processed by the microprocessor 48 in the manner described above to provide the protection functions.

If the value MESURI is lower than the current INTPHA, for example at the time t2 corresponding to the descending phase of the analog signal, the measurements MESURI and MESURI-1 are compared. At the time t2 the measurement MESURI is not greater than MESURI-1 and the MESURI value is entered in the MESURI-1 memory. Then a check is made to see whether TEMPEC is equal to zero, which is not the case at the time t2 and TEMPEC is decremented. The current INTPHA is processed to provide the protection function.

At the time t3 corresponding to the rising phase of the following alternation, the measurement MESURI is still lower than the current INTPHA, but it is higher than MESURI-1 (increasing phase). The measurement MESURI is compared with the peak DERCRE and as MESURI is greater than DERCRE the value MESURI is entered in the memory before continuing with the aforementioned program of entering the value MESURI in the MESURI-1 memory and the other operations. In the example according to FIG. 6, the sampled peak value of the second alternation is lower than that of the first alternation and it can be seen that the stored INTPHA value retained for processing is the higher peak value. Actually the two alternations of the analog signal are identical, the difference of the sampled peak values resulting from the sampling. By latching, according to the invention, at the last peak, in this case by retaining the first higher peak value instead of the second, the error is notably reduced. The value of the second peak is stored temporarily in the DERCRE memory.

At the time t4 of the third alternation, MESURI exceeds INTPHA again and DERCRE is zero reset in the way described for the first alternation, MESURI replacing the value MESURI-1 and INTPHA in the memory. TEMPEC is reset to the maximum value and the new sampled peak value INTPHA is latched.

The amplitude of alternations 4 and 5 is lower than that of the third alternation and the countdown proceeds normally until the time t5 when zero is reached. Referring to the flow chart it can be seen that is TEMPEC is equal to zero and DERCRE is different from zero, which is the case in t5, the value DERCRE replaces the value INTPHA in the memory and DERCRE is zero reset.

It can easily be understood that during the countdown period TEMPEC, which is for example 22 milliseconds, the processed value, stored in INTPHA, corresponds to the sampled value latched at the last peak, the countdown being restarted each time the peak value is again exceeded. This latched value takes account of at least two peak values for a 50 Hz alternating current each alternation of which has a duration of 10 milliseconds. If for the 22 milliseconds the peak values remain lower than the latched peak value INTPHA, the latter is replaced by the value DERCRE which is the last latched peak value lower than INTPHA. If the peak values are increasing, the processed signal immediately takes this increase into account, whereas if they are decreasing a time delay of 22 milliseconds occurs. Latching at the last peak has no effect on the instantaneous trip, but for the short delay and long delay trip it enables the sampling error to be reduced. The time delay of 22 milliseconds may cause an unjustified trip, but the influence is small considering the time delays in the order of a second of such trips. The 22 milliseconds are a compromise between a greater accuracy on the peak value and as small a difference as possible between the tripping and non-tripping time. It is obvious that the time delay can be increased to include a larger number of alternations thus increasing the accuracy, notably when the peak value is measured or displayed independently from control of the circuit breaker. The process of latching at the last peak has been described above for a phase fault, but it is used with the same advantages for ground fault protection.

Thermal Image of the Long Delay Trip

The inverse long delay trip function $I^2 t = $ constant, represented by the straight line 100 in FIG. 3, is equivalent to that of the bimetallic strip of a conventional circuit breaker which heats up when the current is higher than a first pick-up and cools down if the current is lower than this pick-up. According to the invention, this inverse function is performed by computing a thermal image of a bimetallic strip represented by a stored digital value. During the heating phase this stored value is incremented by a preset factor to express the temperature rise, whereas this stored value is decremented during a cooling phase. Tripping occurs when the stored value exceeds a pick-up level. This thermal image makes it possible to take the previous state into account and to give an accurate account of the temperature of the bimetallic strip or of the equipment protected by the circuit breaker.

Figure 8:
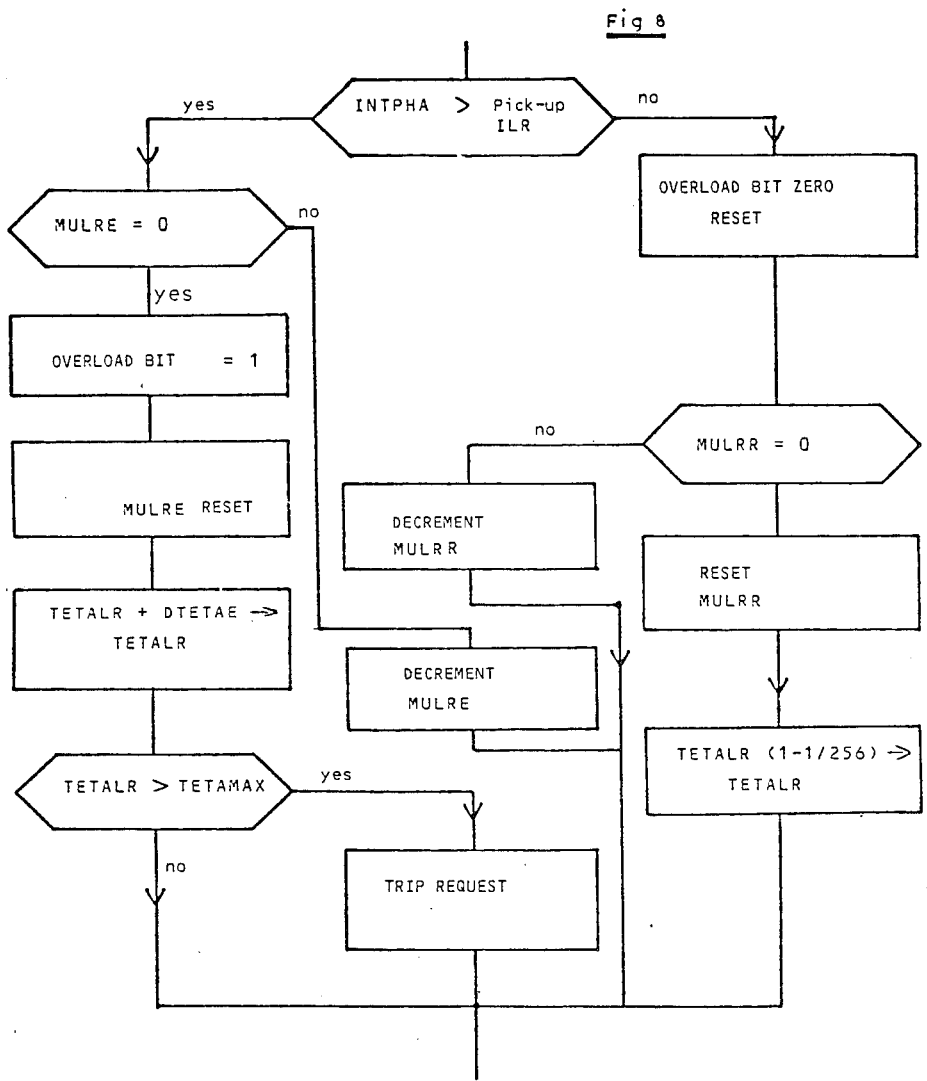
FIG. 8 is the flow chart of the long inverse time delay function.

The long delay inverse function is performed by the program of the microprocessor 48, illustrated by FIG. 8 and described hereinafter. The current INTPHA is the aforementioned value of the phase current latched at the last peak. The microprocessor 48 compares the value INTPHA with the pick-up ILR displayed by the switch 80. If the current INTPHA is not higher than the pick-up ILR, the overload bit, which supplies the indicator lamp 94, is reset, the indicator lamp 94 thereby being out. A check is made to see whether a multiplying factor MULRR (Cooling long delay multiplier), stored in the RAM, is equal to zero. If not, the multiplier MULRR is decremented and the program is looped. If the multiplier MULRR is equal to zero, this multiplier is initialized at a number determined by the position of the long delay time switch 78 and a value TETALR (Temperature TETA of a simulated bimetallic strip for the long delay function) recorded in the RAM, is multiplied by a reduction factor representing the cooling down of the equivalent bimetallic strip, the new value TETALR being substituted for the previous one in the memory. This sequence corresponds to a cooling down of the bimetallic strip.

A heating phase starts up when the current INTPHA becomes greater than the pick-up ILR. In a similar way to that of the cooling-down phase, a check is made to see whether a multiplying factor MULRE (Heating long delay multiplier) is equal to zero. If not, the multiplier MULRE is decremented and the program is looped. If the multiplier MULRE is equal to zero, the overload bit takes the value 1 to light the indicator lamp 94 and the multiplier MULRE is initialized at a number determined by the switch 78. An arithmetic and logic unit of the microprocessor 48 executes a current squaring operation and computes a value DTETAE (Delta TETA heating) representing the heating, which is added to the previous stored value TETALR to determine the new image temperature. If the latter is greater than a maximum value TETAMAX, the trip bit goes to 1 and causes tripping of the circuit breaker. If not the program is looped.

The role of the multiplying factors MULRR and MULRE is to adjust the rhythm of incrementation or decrementation of the digitized thermal image. It can be seen that setting the multipliers to the number three causes operation, one time out of three, which results in a time delay three times longer. These multipliers allow a choice of the long delay tripping curve.

Figure 9:
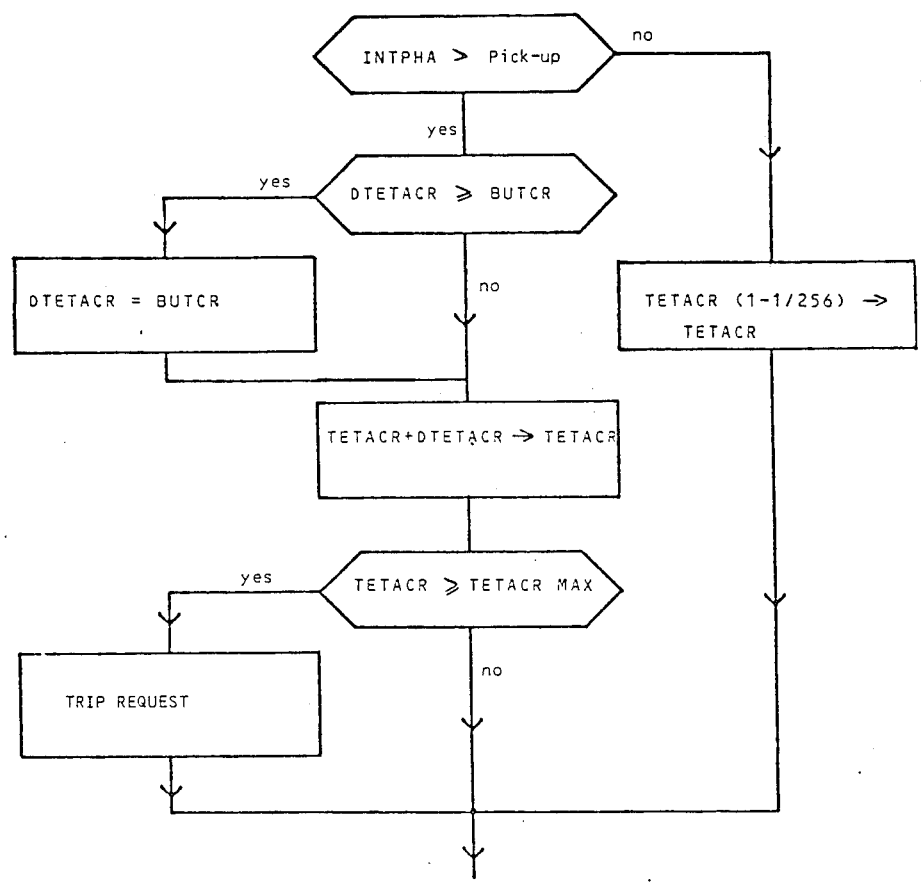
FIG. 9 is the flow chart of the short inverse time delay function.

The short delay inverse time function is performed in a similar manner by the flow chart set out in FIG. 9. If the current INTPHA is lower than the pick-up ICR, the temperature of a bimetallic strip simulated for the short delay function TETACR is multiplied by a reduction factor representing the cooling-down and the new value is entered in the RAM. If the current INTPHA exceeds the pick-up ICR, a check is made to see whether the square of the sampled current latched at the last peak DTETACR, which corresponds to heating, is greater than a given maximum stop value BUTCR, corresponding to the switchover from inverse time tripping to definite time tripping of the short delay function. If not, the value TETACR is replaced in the memory by the incremented value TETACR+DTETACR and a check is made to see whether this new value TETACR exceeds the trip pick-up TETACRMAX. If it does, a tripping order is transmitted to the relay 14 providing inverse time short delay protection. When the temperature rise DTETACR is greater than the stop value BUTCR, the latter value is substituted for DTETACR and added to the value TETACR in the previously described manner to bring about a trip or not depending on whether the new value TETACR representing the simulated temperature of the bimetallic strip is greater than the pick-up TETACRMAX or not.

Software Organization

Figure 10:
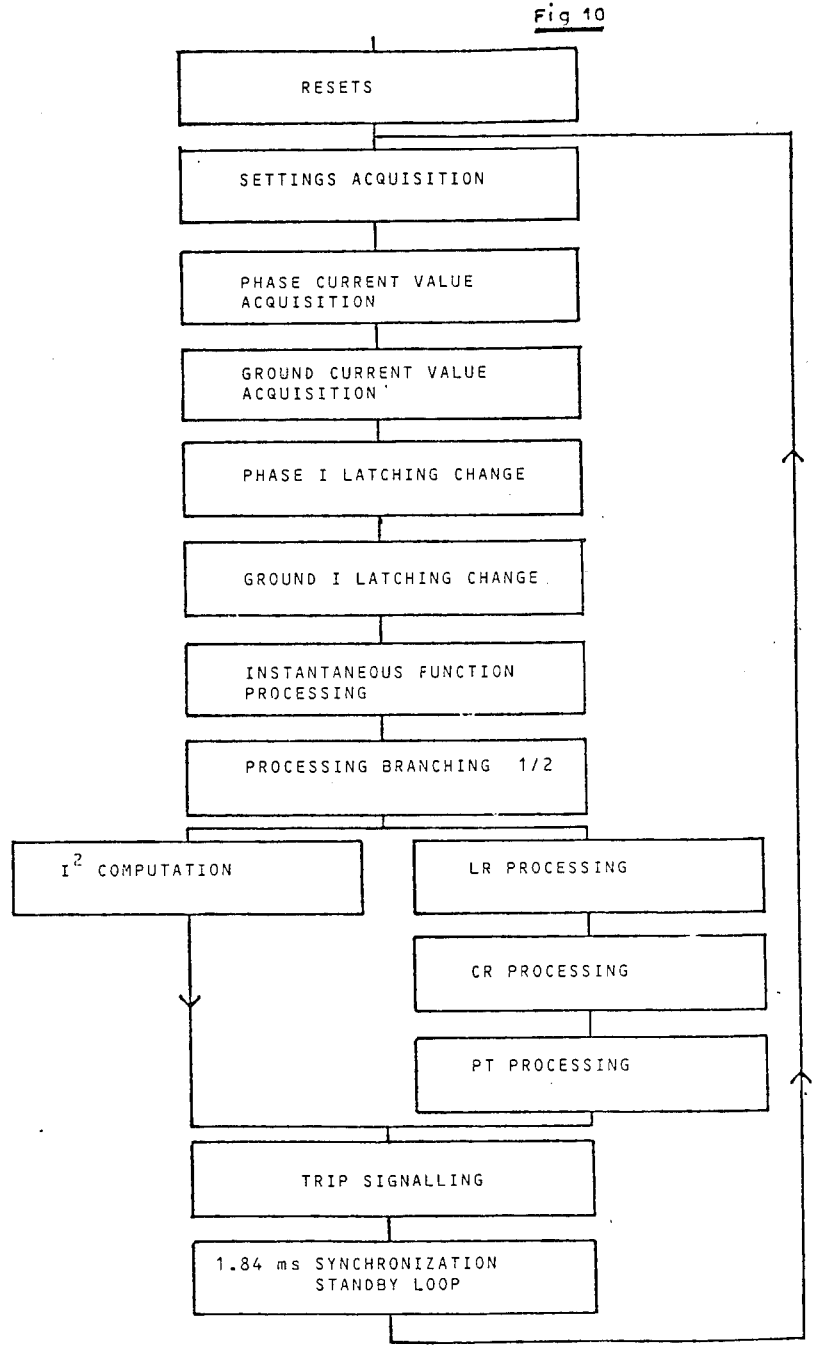
FIG. 10 is the flow chart of the overall tripping function.

FIG. 10 represents the main circuit breaker program according to the invention. After the resets, the microprocessor 48 acquires the setting parameters entered by the switches 72–86 of the block 54. Then it reads the phase current and ground current values supplied by the multiplexer 29, all this data being recorded in the RAM. The microprocessor 48 then proceeds with sampling of latching at the last peak of the phase current and ground current in the previously described manner. It then processes the instantaneous function checking whether the phase current latched at the last peaks exceeds the instantaneous trip pick-up IIN or not. The program is then subdivided into two branches run alternatively, the first consisting in computing the square of the current necessary to determine the inverse time function, and the second in successive processing of the long delay, short delay and ground fault protection function. This separation of the processing operations enables the program time to be reduced to a value of 1.84 milliseconds. The signalling and tripping instructions are emitted and a fresh cycle is executed after a synchronization standby respecting the cycle time of 1.84 milliseconds.

Analog Instaneous Tripping

Figure 11:
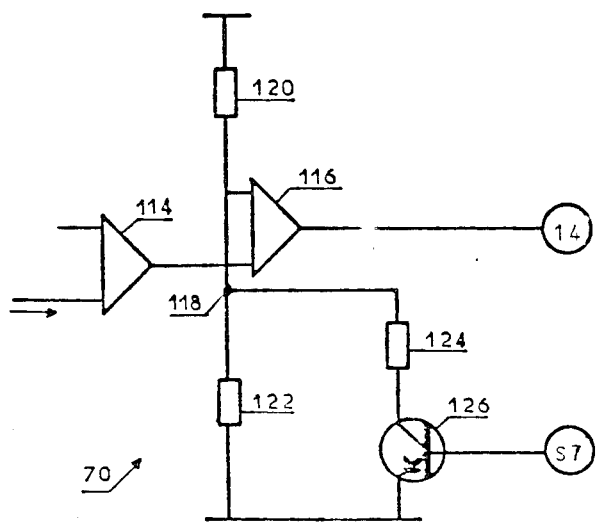
FIG. 11 is the detailed diagram of the analog processing loop.

Operation of the above-mentioned digital processing trip unit is imperfect when a large short-circuit occurs and during the startup period. Digital processing is fast, but not instantaneous and this delay may in certain cases lead to the destruction of the protected installation and/or of the circuit breaker. According to the present invention, the digital processing loop is shunted by an analog processing loop to provide an additional instantaneous protection. The rectified signal, proportional to the current in the conductors RST and present at the output of the rectifier bridges 18, is processed in the analog unit 70, to generate an instantaneous tripping order transmitted to the relay 14 when preset pick-ups are exceeded. Referring more particularly to FIG. 11, it can be seen that the signal applied to the input of the unit 70 is amplified in an operational amplifier 114 whose output is connected to an input of the comparator 116, whose output is connected to the relay 14. The other input of the comparator 116 is connected to the point 118 of a divider bridge with two series-mounted resistors 120, 122. A shunting circuit formed by a resistor 124 and a transistor 126 in series is connected parallel to the resistor 122. The transistor 126 is controlled by an order emitted on the output S7 of the register 58 to interrupt or close the shunting circuit. It can easily be seen that the divider bridge 120, 122 and the shunting circuit 124, 126 determine two different pick-ups IR, IR1 depending on whether the transistor 126 is blocked or conducting, the comparator 116 comparing the signal with these pick-ups to emit the tripping order when these pick-ups are exceeded. Referring to FIG. 3, it can be seen that the pick-up IR is higher than the digital instantaneous trip pick-up IIN, the pick-up IR1 being slightly lower than or equal to the pick-up IIN. The pick-up IR is selected when the output S7 is activated, i.e. when the digital processing loop operates. If the digital loop is not activated the analog loop intervention pick-up is reduced to the value IR1.

The instantaneous analog trip unit operates in the following manner:

In normal operation the analog trip unit does not intervene, overloads and short-circuits being dealt with by the digital trip unit. The analog trip unit operating pick-up is set to the value IR and only a short-circuit of an exceptional value greater than the pick-up IR is dealt with by both loops, the analog loop preceding the digital loop and ordering the trip. This fast trip ensures protection of the circuit breaker.

In the start-up period, notably on circuit breaker closing, the digital loop is inactive for a short start-up period and the analog trip unit pick-up is automatically reduced to the lower value IR1 by the lack of a signal on the output S7. Should a short-circuit occur, in particular on closing on a fault, the analog trip unit intervenes as soon as the pick-up IR1 is exceeded protecting both the circuit breaker and the installation. The analog loop in addition acts as a back-up should the digital loop fail and increases the reliability of the trip unit without giving rise to notable complications. It should be noted that changing the analog trip unit pick-up can be performed in a different way.

The trip unit according to the invention combines the advantages of analog trip units and digital trip units without notable complications.

I claim:

1. A digital solid-state trip unit for an electrical circuit breaker comprising:
   current sensor means for generating analog signals proportional to currents flowing through conductors protected by the circuit breaker,
   rectifier circuit means for rectifying said signals and for producing a continuous analog signal representative of a maximum value of said currents,
   analog-to-digital converter means having an input for receiving said analog signal and an output for delivering a corresponding sampled digitized signal,
   microprocessor-based digital processing unit means, to which the digitized signal is applied for providing a long delay trip function and a short delay trip function and for generating a circuit breaker tripping order, when said digitized signal exceeds preset pick-ups, said order being time delayed in terms of the value of the digitized signal,
   circuit breaker trip means activated by said tripping order,
   analog processing unit means to which said analog signal representative of the maximum value of said currents is applied substantially simultaneously with application of said analog signal to the digital processing unit, said analog processing unit means being designed to send an instantaneous tripping order when an instantaneous pick-up is exceeded by said analog signal, said order being transmitted to said tripping means.

2. A digital solid-state trip unit for an electrical circuit breaker comprising:
   current sensor means for generating analog signals proportional to currents flowing through conductors protected by the circuit breaker;
   rectifier circuit means for rectifying said analog signals and for delivering a continuous analog signal representative of a maximum value of said currents;
   analog-to-digital converter means having an input for receiving said analog signal representative of the maximum value of said currents, and having an output for producing a corresponding sampled digitized signal;
   microprocessor-based digital processing unit means, to which the digitized signal is applied, for providing a long delay trip function and a short delay trip function, and for generating a circuit breaker tripping order when corresponding predetermined levels are exceeded by said digitized signal, said digital processing unit means further providing an instantaneous tripping function when the digitized signal exceeds a first instantaneous pick-up;
   circuit breaker trip means activated by said tripping order;
   analog processing unit means, to which said analog signal representative of the maximum value of said currents is applied, for generating an instantaneous tripping order when said analog signal representative of the maximum value of said currents exceeds a second instantaneous pick-up, said tripping order being transmitted to said circuit breaker trip means;
   means for detecting operation of said digital processing unit means and for controlling the value of said second instantaneous pick-up, said second instantaneous pick-up being greater than said first instantaneous pick-up when the said digital processing unit means is operating, and being less than or equal to said first instantaneous pick-up when said digital processing unit means is not operating.

3. A trip unit according to claim 2, wherein said analog processing unit means comprises a comparator having first and second inputs, said first input receiving said analog signal representative of the maximum value of said currents, and said second input being connected to a midpoint of a resistive divider bridge having a variable ratio, said ratio being controlled by said means for detecting operation of said digital processing unit means, for modifying said second instantaneous pick-up, said comparator means having an output connected to said circuit breaker trip means.

* * * * *